J. K. ULLMANN.
BRAKE FOR VEHICLE WHEELS.
APPLICATION FILED DEC. 7, 1910.

1,017,930.

Patented Feb. 20, 1912.

UNITED STATES PATENT OFFICE.

JACOB KARL ULLMANN, OF NEW HAVEN, CONNECTICUT.

BRAKE FOR VEHICLE-WHEELS.

1,017,930. Specification of Letters Patent. Patented Feb. 20, 1912.

Application filed December 7, 1910. Serial No. 596,004.

*To all whom it may concern:*

Be it known that I, JACOB KARL ULLMANN, a subject of the Emperor of Russia, residing at New Haven, in the county of New Haven and State of Connecticut, have invented certain new and useful Improvements in Brakes for Vehicle-Wheels, of which the following is a specification.

The present invention relates to brakes for vehicle wheels and has for its object to provide a brake that will allow a rapid, almost instantaneous, arrest of the vehicle.

The new feature in my invention consists in that instead of ordinary brake blocks, which hitherto have been applied to act against the wheel at a point located at a considerable distance from the bearing point thereof, I employ brakes consisting of spring plates which extend downward toward the bearing point of the wheel and in operation are adapted to engage the wheel at the bearing point and thereby arrest the wheel instantaneously.

In order to make my invention more clear, the same is illustrated in the accompanying drawing, in which similar reference letters denote corresponding parts and in which—

Figure 1:
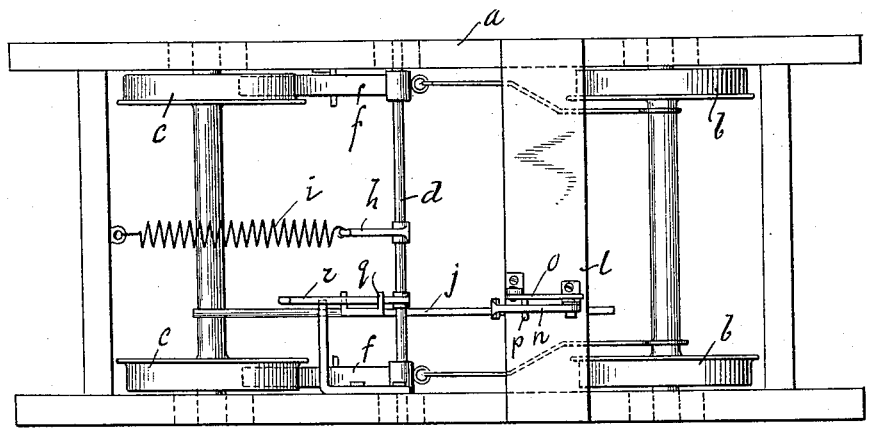
Figure 2:
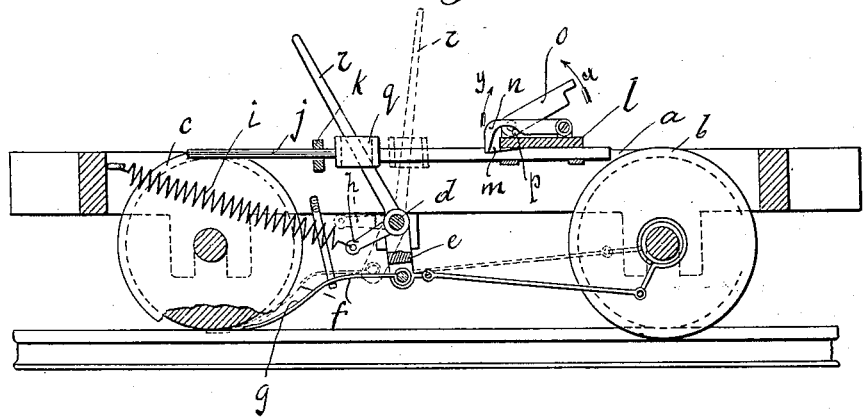

Figure 1 is a plan view of a vehicle with my new brake applied thereto and Fig. 2 is a longitudinal section of the vehicle illustrating the operation of the brake.

In the drawing, which forms a part of this specification, I have illustrated a vehicle running on rails, but it is understood that my device may be likewise applied to automobiles or similar vehicles.

$a$ denotes the frame of the vehicle, $b$ the front wheels and $c$ the rear wheels thereof. Extending parallel to the axles of the wheels and rotatably supported in the frame $a$ of the vehicle is a spindle $d$ to the ends of which, by means of downwardly projecting arms $e$, spring plates $f$ are secured, which extend toward the circumference of the rear wheels and are bent downward and concaved relative to the circumference of the wheels as at $g$. The free ends of these spring plates normally are adapted to lie substantially flush with the ground or the rails upon which the wheels run. The spindle $d$ is spring actuated, so that it will constantly tend to throw the brake plates into operation. To this end, a crank arm $h$ is fixed to the spindle $d$, to which arm one end of a strong spiral spring $i$ is secured, the other end of which is fixed to the rear part of the frame.

To hold the brake plates in retracted position, that is, in the position shown in full lines in Fig. 2, I provide the following mechanism: A rod $j$ is slidably guided in longitudinal direction in stationary guide pieces $k$, $l$ provided on the frame $a$ and near its forward end said rod has a tapered notch $m$. A catch, consisting of a hook-shaped lever $n$ is pivoted to the forward end of the guide piece $l$ and is adapted to engage the tapered notch of the said rod in a position which as will be hereinafter explained, holds the brake plates out of operation. A second lever $o$ is pivotally secured to the opposite end of said guide piece $l$ and is provided with a cam pin $p$ which so engages the catch $n$ that upon the swinging of the said second lever in the direction of the arrow $x$ the catch will be swung in the reverse direction $y$ and become released from within the tapered notch $m$ of the rod $j$. The latter, furthermore, is provided with a recessed piece $q$ with which a lever arm $r$ engages. The latter is fixed to the spindle $d$ and projects upward through said piece $q$. When the catch $n$ engages the tapered notch $m$ of the rod $j$, the lever $r$ extends in the direction shown in full lines in Fig. 2 and secures the spindle $d$ from being turned by the action of the spring $i$ and consequently holds the brake plates $f$ in the retracted position. But when it is desired to apply the brake plates the cam lever $o$ is turned in the direction of the arrow $x$ releasing the catch $n$ and permitting the rod $j$ under the action of the spring $i$ and through the medium of the lever $r$ of being thrust forward in consequence of which the brake arms adopt the dotted line position (Fig. 2) engaging the wheels around the lower part of their circumferences and at their bearing points, whereby an efficient braking and a rapid, almost instantaneous, arrest of the wheels is brought about.

What I claim and desire to secure by Letters Patent is:

In combination with a vehicle and the wheels thereof, of a rotary spindle, brakes consisting of curved or bent spring plates, fixed to said spindle and extending toward the lower part of the circumferences and the bearing points of the wheels, a spring actuated sliding member, a member secured to the spindle and operatively connected with said sliding member and a catch for said sliding member to lock the latter in a position in which the spring plates are retracted.

In testimony whereof I affix my signature in presence of two witnesses.

JACOB KARL ULLMANN.

Witnesses:
    JOHN T. CARMODY,
    MAX D. ORDMANN.

Copies of this patent may be obtained for five cents each, by addressing the "Commissioner of Patents, Washington, D. C."